US012764207B2

(12) United States Patent
Crowder et al.

(10) Patent No.: US 12,764,207 B2
(45) Date of Patent: Oct. 13, 2026

(54) METHOD AND APPARATUS FOR TIMEOUT SETTING PROPAGATION

(71) Applicant: Level 3 Communications, LLC, Broomfield, CO (US)

(72) Inventors: William Crowder, Camarillo, CA (US); William Power, Boulder, CO (US); Laurence Lipstone, Calabasas, CA (US)

(73) Assignee: Level 3 Communications, LLC, Denver, CO (US)

( * ) Notice: Subject to any disclaimer, the term of this patent is extended or adjusted under 35 U.S.C. 154(b) by 635 days.

(21) Appl. No.: 18/060,426

(22) Filed: Nov. 30, 2022

(65) Prior Publication Data

US 2023/0239380 A1 Jul. 27, 2023

Related U.S. Application Data

(60) Provisional application No. 63/267,094, filed on Jan. 24, 2022.

(51) Int. Cl.

| | |
|---|---|
| ***G06F 16/957*** | (2019.01) |
| ***G06F 15/16*** | (2006.01) |
| ***H04L 1/1867*** | (2023.01) |
| ***H04L 29/06*** | (2006.01) |
| ***H04L 29/08*** | (2006.01) |
| ***H04L 69/22*** | (2022.01) |
| ***H04L 69/28*** | (2022.01) |

(52) U.S. Cl.

CPC .............. *H04L 69/28* (2013.01); *H04L 1/188* (2013.01); *H04L 69/22* (2013.01)

(58) Field of Classification Search

CPC . H04L 69/28; H04L 67/5651; H04L 67/2828; H04L 29/08783; H04L 1/188; H04L 41/0233; H04L 43/0817; H04L 67/1023; H04L 67/2842; H04L 69/22; H04L 63/08; H04L 63/0861; H04L 67/2876; H04L 67/568; H04L 69/02; H04L 69/04; G06F 16/9574

USPC .......................................................... 370/508

See application file for complete search history.

(56) References Cited

U.S. PATENT DOCUMENTS 6,002,737 A * 12/1999 Devanagundy ........... G06F 1/14 377/16
9,807,197 B2 * 10/2017 Adisesha ................ H04L 67/30
9,998,209 B2 * 6/2018 Asterjadhi ............... H04B 7/26
10,326,853 B2 * 6/2019 Graham-Cumming ...................... H04L 67/5651
10,616,439 B2 * 4/2020 Gharaibeh ......... H04N 1/32208
11,356,261 B2 * 6/2022 Latimer ................ H04L 9/0891
11,366,870 B1 * 6/2022 Yanacek ............. G06F 16/9574
2005/0182843 A1 * 8/2005 Reistad ............... H04L 43/0817 709/229

(Continued)

*Primary Examiner* — Edan Orgad
*Assistant Examiner* — Vanneilian Lalchinthang

(57) ABSTRACT

A method and apparatus for managing requests in a computer network. A request for a resource from a first node is received by a second node. The request for a resource comprises a header with a timeout indication corresponding to an amount of time the first node will wait for a response to its request for the resource. The second node sends to the first node a response to the request for the resource prior to the end of the amount of time indicated in the timeout indication. The response to the request comprises either the resource or an error message.

9 Claims, 4 Drawing Sheets

(56) References Cited

U.S. PATENT DOCUMENTS

| | | | | |
|---|---|---|---|---|
| 2009/0172674 | A1* | 7/2009 | Bobak | G06F 11/1482 718/101 |
| 2012/0210012 | A1* | 8/2012 | Jansson | H04L 67/562 709/230 |
| 2012/0324113 | A1* | 12/2012 | Prince | H04L 61/4511 709/226 |
| 2014/0189828 | A1* | 7/2014 | Baghdasaryan | H04L 63/0861 726/6 |
| 2016/0366488 | A1* | 12/2016 | Long | H04N 21/23439 |

* cited by examiner

METHOD AND APPARATUS FOR TIMEOUT SETTING PROPAGATION

CROSS-REFERENCE TO RELATED APPLICATIONS

This application claims the benefit of U.S. Provisional Application No. 63/267,094 filed Jan. 24, 2022, entitled "Method and Apparatus for Timeout Setting Propagation," which is incorporated herein by reference in its entirety.

BACKGROUND

When a first computing device requests a resource from a second computing device, it may be configured to wait a preset period of time for a response before requesting the resource from a different computing device. It is with respect to this general technological environment that aspects of the present application are directed.

SUMMARY

The present application describes systems and methods for timeout setting propagation. For example, a method is described comprising receiving, from a first node at a second node, a first request for a resource, wherein the first request comprises a first timeout indication corresponding to a first amount of time the first node will wait for a response to said first request for the resource; and sending, by the second node to the first node, a response to the first request prior to the end of the first amount of time, wherein the response to the first request comprises either the resource or an error message.

In another example, a system is described comprising at least one processor, memory operatively connected to said at least one processor, and instructions stored in said memory, wherein said instructions are executable to cause the system to: receive, from a first node at a second node, a first request for a resource, wherein the first request comprises a first timeout indication corresponding to a first amount of time the first node will wait for a response to said first request for the resource; and send, by the second node to the first node, a response to the first request prior to the end of the first amount of time from the first request, wherein the response to the first request comprises either the resource or an error message.

In still another example, a method is described comprising: generating a first timeout indication by a first node, the first timeout indication corresponding to a first amount of time the first node will wait for a response to a request; sending a first request by the first node to a second node, the first request comprising a request for a resource and including the first timeout indication in a header or other metadata associated with the first request; when a first response is received by the first node before the end of the first period of time, processing the response by: when the first response includes the resource, extracting the resource; or when the first response does not include the resource, sending a second request for the resource to a third node, the second request including a second timeout indication corresponding to a second amount of time that the first node will wait for a response to the second request; and when no response is received by the first node before the end of the first period of time following the first request: sending the second request for the resource to the third node, the second request including the second timeout indication corresponding to the second amount of time that the first node will wait for the response to the second request; and marking, by the first node, the second node as faulty.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE FIGURES

The invention can be better understood with reference to the figures. In these figures, like reference numerals designate corresponding parts throughout the different figures and views.

DETAILED DESCRIPTION

Figure 1:
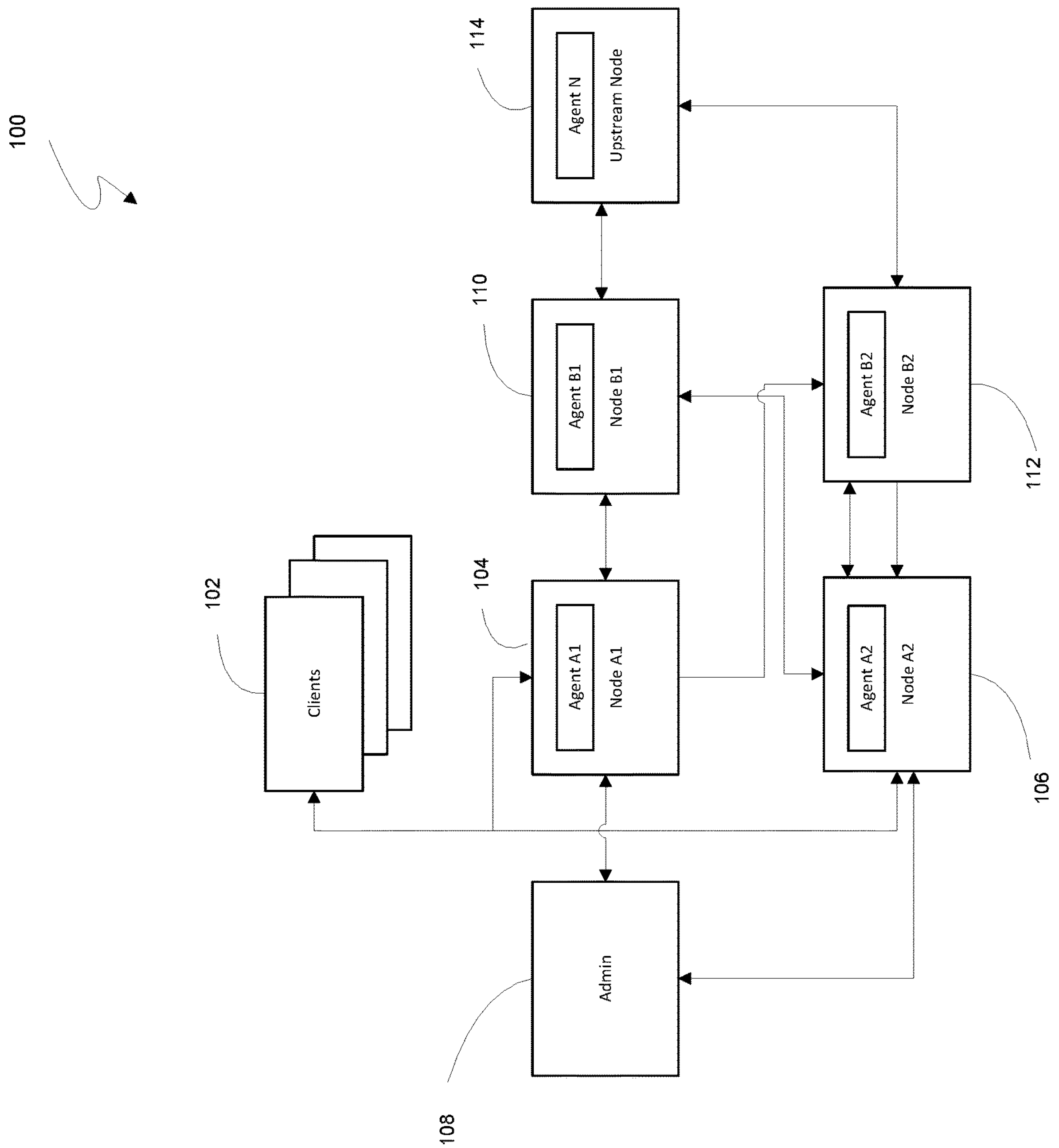
FIG. 1 shows a block diagram of a plurality of computing devices in a network configured according to examples of the present disclosure.

The systems, methods, and apparatus of the present invention are described below with reference to the figures. The description and figures are for illustrative purposes only, they do not limit the scope of the present application.

Electronic communications and the transfer of data between computing devices are prevalent aspects of computer networks. For example, one computing device operatively connected to a network may need to communicate, or transfer a resource, to another computer operatively connected to the same network. In a content distribution network (CDN) environment, for example, a client computing device may generate an electronic communication to a server in the CDN, where the electronic communication comprises a request for a transfer of data to a user's computer. The CDN, in concert with its various components, facilitates the requested data transfer.

Sometimes a request for a resource sent by one computing device to another does not receive a timely response, or it receives no response at all (e.g., if a connection between the devices is closed before a response is received). The requesting computing device may not be able to differentiate between the requestee device being generally inoperable or simply being unable to fulfill the specific request before the requesting device times out. Thus, if the requesting device does not receive a timely response, the requesting device may consider the requestee device to be inoperable even when the requestee device is operating normally but was unable to fulfill the request in a timely manner for other reasons, e.g., upstream delays.

In addition, when the first (requesting) computing device eventually times out while waiting for a response from the second computing device, it may seek the resource elsewhere. If the second computing device sends a late response that is ignored by the first computing device because the first computing device has received the resource from a different source, then the second computing device may have wasted computing resources compiling and sending an unnecessary response. Further, there may be situations where the second computing device is able to determine (based on its own load, the proximity of the requested resource, etc.) how long it will take to generate a response. However, if the second computing device does not know the maximum amount of time that the first (requesting) computing device will wait for a response, it may keep trying to generate the response (even if it would be more efficient to send an immediate error message so that the first computing device can request the resource form another source). Aspects of the present disclosure address these considerations.

As discussed, data communications sometimes include requests for a resource, such as documents, a media file, or other data. In CDN environments, the CDN may receive a request from a customer to deliver a certain resource, such as a particular media file, to a user's computing device. In a CDN, media files may be delivered to a user's computing device via an edge node. In such embodiment, the resource may have either been previously cached to the edge node (whereby it is already available on the edge node for delivery to the user), or the resource is available on a different computing device, such as an upstream server, that is accessible by the edge node on the network. The edge node will obtain a copy of the resource if it does not have it cached already. Once obtained by the edge node, either from its cache or from another device on the network, the edge node delivers the resource to the user's computing device.

Referring to FIG. 1, a block diagram of an exemplary computing network 100 is shown. In this example, one or more client computing devices 102 are operatively connected to nodes A1 104 and A2 106. In examples, nodes A1 104 and A2 106 may comprise edge nodes in a CDN, but the present disclosure is not limited to that environment. In examples in which computing network 100 comprises a CDN, each of nodes A1 104, A2 106, B1 110, B2 112, etc., may have an associated cache that stores recently used and/or popular resources for quicker delivery to client devices.

In examples, a client computing device 102 sends a request for a resource (such as a request for data, content stored in a CDN, etc.) to one of the edge nodes, such as node A1 104. Node A1 104 may then serve the requested resource, if the requested resource is available (e.g., cached) locally, or request the requested resource from an upstream node to which it is operatively connected, such as one of nodes B1 110 or B2 112. For example, in FIG. 1, nodes B1 110, B2 112, etc., may serve as upstream caching nodes for edge nodes A1 104 and A2 106. If the request from node A1 104 is received by node B1 110, for example, node B1 110 may provide the requested resource to node A1 104 (if it is available locally from, e.g., a cache at node B1 110) or forward the resource request to still another upstream node N 114. In examples where nodes 104, 106, 110, and 112 comprise a portion of a CDN, upstream node N 114 may comprise an origin server; and upstream node N 114 may be part of the same CDN as nodes 104, 106, 110, 112, or may be part of a third-party network (such as an origin server resident on the network of a customer of a CDN).

For exemplary purposes only, the timeout propagation aspects of the present disclosure are discussed below in relation to a resource request that originates at a client device 102; however, in other examples, edge nodes A1 104, A2 106, etc., may not receive a separate content request from a client device 102. Rather, nodes A1 104 and/or A2 106 may have a need to access, or obtain, a certain resource in order to perform their own tasks or processing. The present teachings may apply to any embodiments wherein a computing device on a network needs to access, or obtain, a resource from another source over a network. In addition, in some examples, each "node" within network 100 may comprise a separate computing device, e.g., a server computing device. In other examples, two or more "nodes" within network 100 may be instantiated on a single computing device, such as multiple virtual machines, software agents, etc., that are operating on a single computing device.

As discussed, nodes within a network may utilize a timeout period when making requests of other nodes in the network. A timeout period is generally the amount of time that a node will wait for a response to a request. In some networks, all nodes share a common configuration and, accordingly, all use the same timeout period when making requests of other nodes and determining when to give up on a request and seek a requested resource elsewhere. However, shared configurations are not always possible and/or may be difficult to maintain. For example, in large networks, performing updates to configuration files of all machines simultaneously is often not possible. Without a uniform, shared configuration among nodes, when a first node (requesting node) requests a resource from a second node (requestee node), the requestee node cannot determine how long the requesting node is going to wait for a response.

Further, even with common configurations, if each node is starting its timeout countdown at the time it receives a request, then the last requestee node in the series is going to wait until a later absolute time than the first requestor node, because the last requestee node started its clock later due to propagation delays. This effect is amplified as the number of upstream nodes increases. As such, in examples, the first requestor will time out before receiving an error response because one or more upstream nodes will have started their timeout clocks later due to propagation delays. As such, presently disclosed systems and methods propagate a requesting node's timeout setting in the request for the resource, itself. Further, requestee nodes are configured to, before the end of the requesting node's timeout period, send either the requested resource or an error message indicating that the requestee node cannot fulfill the request. Among other things, this permits the requesting computing device to differentiate between the requestee device being inoperable (when no response is received) or simply being unable to fulfill the request before the requesting device times out. In addition, if the requestee node determines that it cannot fulfill the request within the requesting node's timeout period, the requestee node can stop using resources in trying fulfill the request and can send an error message as soon as the requestee node determines that it cannot fulfill the requesting node's request within the requesting node's timeout period. This also allows the requesting node to request the resource from another source sooner than if it had to wait for the original timeout period to expire. Examples of this are discussed below in relation to network 100 of FIG. 1.

In an example, a client device 102 sends a request for a resource to node A1 104. Node A1 104 determines that it does not have the requested resource cached locally and must pass the resource request to an upstream node. Node A1 104 may include an agent A1 (e.g., a software program or module operating on node A1 104) configured to (a) forward the request (or send a new request for the resource) to, e.g., node B1 110 and (b) include within the forwarded request a timeout indication for node A1 104. In examples, the timeout indication is inserted into a header (e.g., a hypertext transfer protocol (HTTP) header) of the request sent to node B1 110. In examples, the protocol used between the nodes A1 104 and B1 110 (and the other nodes of the network 100) may be HTTP, the present disclosure is not so limited. Further, although the timeout indication may be included in the header of the request message between nodes, in other examples, the timeout indication may be included elsewhere in the request message.

In examples, the timeout indication may be a timeout period. For example, in one example, the timeout indication may comprise a timeout period of five seconds. In that example, the timeout indication would indicate to node B1 110 that node A1 104 will wait five seconds for a response before timing out. Internal at node A1 104, however, agent A1 may be configured to cause node A1 104 to wait slightly longer (e.g., an extra 50 to 100 milliseconds) than five seconds for a response from node B1 110 to account for propagation delays. For example, even though the timeout indication sent by node A1 104 indicates a timeout period of five seconds, node A1 104 may wait to time out the request until a longer period (e.g., 5050 milliseconds) has passed since sending the request to account for round-trip propagation delays.

In other examples, the timeout indication may be an absolute time, such as a particular clock value/timestamp. In such examples, those skilled in the art will recognize that the requesting computing device and the requestee computing device must have synchronized clocks. Again, however, even though the timeout indication sent by node A1 104 indicates a particular clock value, node A1 104 may wait to time out the request until a longer period (e.g., an extra 50 milliseconds) after such clock value has passed to account for propagation delays.

In either example, the timeout indication represents a limit on the amount of time the requesting node (node A1 104, in this example) will wait to receive a response to its request. Upon receiving the request from node A1 104, node B1 110 will note the timeout indication received from node A1 104 and attempt to fulfill the request in the time allotted. For example, if the timeout indication from node A1 104 is a timeout period, node B1 110 may set a timer upon receipt of the request that expires at the end of the timeout period. If the timeout indication from node A1 104 is a clock time, the node B1 110 may simply use that clock time as an expiry time for the purposes of attempting to fulfill the request from node A1 104. In either event, the node B1 110 is configured (e.g., using agent B1 operating on node B1 110) to send some type of response to node A1 104 prior to the expiration of the time indicated in the timeout indication of the request received from node A1 104. For example, node B1 110 may send a response that includes the requested resource. Alternatively, node B1 110 may send an error message that indicates the request could not be fulfilled in the time allotted. In examples, node B1 110 may wait until nearly the end of the allotted time to send an error message. In other examples, node B1 may send the error message as soon as node B1 110 determines that it will not be able to fulfill the request in time (e.g., based on its own load, proximity of the requested resource, etc.), thereby saving as much time as possible for node A1 104 to seek the resource from another source (e.g., node B2 112).

Further, in examples, by sending the error message (rather than simply not responding in the allotted time), the node B1 110 indicates to node A1 104 that node B1 110 is still operable, even though it could not fulfill the request. Accordingly, node A1 104 may continue to treat node B1 110 as operating. If, however, no response is received from node B1 110 within the time allotted according to the timeout indication, then node A1 104 may consider node B1 110 to be faulty (e.g., inoperable). Alternatively, node A1 104 may not explicitly or immediately mark node B1 110 as faulty, but the lack of timely response may be used as a factor in determining a health score of node B1 110. In examples, node A1 104 (or a separate node that receives information from node A1 104) may track a health score of other nodes (such as node B1 110). For example, the lack of a timely response may be considered as a strike against the health score of node B1 110. In examples, that information (along with other data points) may be used in determining whether node B1 110 is faulty and/or in determining a health score for node B1 110. Further, in examples, the health score of potential requestee nodes (and/or a binary faulty/not faulty decision) may be used in determining a best node to which to direct a future request. For example, node A1 104 may then use that information to make future decisions about whether to send future resource requests to node B1 110. E.g., node A1 104 may include an algorithm that would then favor node B2 112 for the next resource request over node B1 110.

In examples, node B1 110, upon receiving the request from node A1 104, may determine that it needs to obtain the requested resource from another source, such as upstream node N 114. In examples, if node B1 110 determines that it needs to obtain the requested resource from upstream node N 114, node B1 110 (e.g., using agent B1) may (a) forward the request (or send a new request for the resource) to node N 114 and (b) include within the forwarded request a second timeout indication for node B1 110. In examples, the second timeout indication is based on, and indicates an earlier expiry time than, the (first) timeout indication that was received in the request from node A1 104 to node B1 110. This accounts for propagation and processing delays to allow node B1 110 to receive a response from node N 114 and still meet the time allotted by the original request from node A1 104.

For example, if the first timeout indication that was received in the request from node A1 104 to node B1 110 comprises a first timeout period, then the second timeout indication in the request from node B1 110 may comprise a second timeout period that is shorter than the first timeout period. In examples, the second timeout period can be determined as a percentage of the first timeout period, a preset amount less than the first timeout period, or otherwise. In examples where the first timeout indication comprises a clock value, the second timeout indication may be expressed as a slightly earlier clock value, again to allow for propagation and processing delays to permit node B1 110 to receive a response from node N 114 and still meet the time allotted by the original request from node A1 104. In examples, the determination of the second timeout indication as a function of the first timeout indication may be based on propagation delays that are measured or heuristically determined. Further, the expected propagation delays may be determined for individual nodes by a particular requesting node's experience with a particular requestee node, for network 100 as a whole, or otherwise.

Those of skill in the art will appreciate that the request may be propagated multiple times through network 100 with each request including an independent timeout indication that is based on the timeout indication that was received from the earlier requesting node. In this manner, each request thereby accounts for expected propagation delays in allowing each requestee node to respond in a timely manner to its requesting node. Administrator system 108 may, in examples, be used to configure the timeout propagation settings of the nodes in network 100, such as the implementation of particular algorithms to determine an outgoing (second) timeout indication based on the received (first) timeout indication (and/or expected propagation delays). For example, administrator system 108 may be used to configure agents A1, A2, B1, B2, N, etc. on their respective nodes to control timeout propagation behavior.

Those of skill in the art will also appreciate that by including the timeout indication in a resource request itself, the requestee device need not have a shared configuration with the requesting device, and the requestee device can easily handle requesting devices that have varying timeout policies. For example, node A1 104 and node A2 106 may utilize different timeout periods; however, node B1 110 may rely on the timeout period included in a resource request from either to accommodate those differences on a per-request basis rather than requiring a globally consistent configuration throughout network 100.

In addition, by configuring the requestee nodes to provide at least an error message back to the requesting node prior to the requesting node timing out its request, it allows the connection between the requesting node and the requestee node to remain open. For example, the error message, in examples, is enough to keep an HTTP connection open. In examples, this saves resources by not requiring the requesting node to close and then reestablish a connection with a requestee node that may be operating normally but was simply unable to timely fulfill the request.

Figure 2:
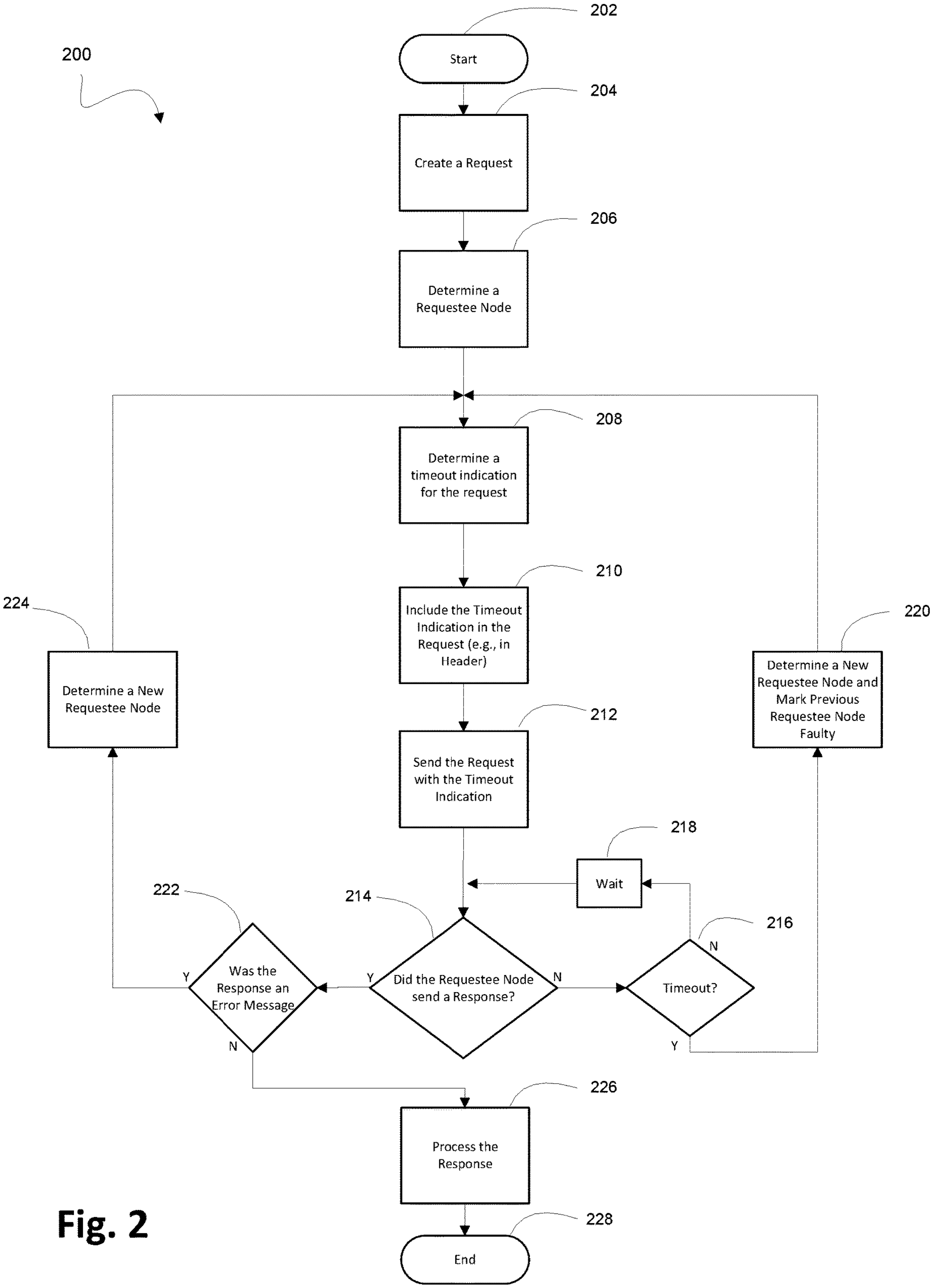
FIG. 2 shows a flowchart of an example method according to the present disclosure.

Referring to FIG. 2, a flowchart of one method 200 according to the teachings of the present disclosure is shown. In examples, the method 200 may be executed by a node in a computing network, such as node A1 104 in FIG. 1. The method 200 starts 202 with a request for a resource being created 204. In examples, the request is based on a request received from another computing device and may include forwarding such request. At operation 206, it is determined where to send the request. For example, node A1 104 in FIG. 1 may determine that the request should be sent to node B1 110.

At operation 208, a timeout indication is determined for the request. As discussed, the timeout indication may comprise a timeout period, a clock time, or otherwise. At operation 210, the timeout indication is included in the request. For example, a control header is created, inserted, or modified in the request to include the determined timeout indication. At operation 212, the request, including the timeout indication, is sent to a requestee node. For example, in the example discussed above, the request may be sent from node A1 104 to node B1 110.

At operation 214, a determination is made whether a response to the request has been received. For example, node A1 104 may periodically determine whether a response has been received. In other examples, the determination may be made a preset amount of time prior to the request timing out, upon notification that a message has been received from the requestee node, or otherwise. If no response has been received, a determination is made at operation 216 whether to time out the request. For example, a determination may be made whether a timeout period indicated by the timeout indication of the request has elapsed or if a clock time indicated in the timeout indication of the request has been passed. As discussed, however, the decision whether to time out the request may allow for some propagation delay by extending the timeout period or clock time indicated in the request by a particular amount before finally determining that the request should be timed out. If the decision is made not to time out the request, at operation 216, then the requesting node waits, and flow proceeds back to operation 214. If a decision is made to time out the request, then flow proceeds to operation 220, where a new requestee node is determined.

Operation 220 may also include noting that the previous requestee node is faulty (e.g., inoperable) because no timely response was received. Alternatively, the requesting node may not explicitly or immediately mark the previous requestee node as faulty, but the lack of timely response may be used as a factor in determining a health score of the previous requestee node. In examples, the requesting node (or a separate node that receives information from the requesting node) may track a health score of other nodes (such as the previous requestee node). For example, the lack of a timely response may be considered as a strike against the health score of the previous requestee node. In examples, that information (along with other data points) may be used in determining whether a particular node is faulty and/or in determining a health score for that particular node. Further, in examples, the health score of potential requestee nodes (and/or a binary faulty/not faulty decision) may be used in determining a best node to which to direct a future request. For example, this information may allow the requesting node to make different decisions about where to send future requests (e.g., disfavoring the previous requestee node). Flow then proceeds back to operation 208 to determine the timeout indication for the new request. In examples, the timeout indication for the new request may be shorter than the original request, as the requesting node may still be attempting to meet a timeout requirement of an earlier requesting node.

If, at operation 214, it is determined that a response to the request has been received, it is determined at operation 222 whether the response is an error message. In examples, the error message may comprise an indication that the requestee device cannot fulfill the request within the time allotted by the timeout indication in the request. If the response is an error message, flow proceeds to operation 224, where a new requestee node is determined. Flow then proceeds back to operation 208 to determine the timeout indication for the new request. As discussed, in examples, the timeout indication for the new request may be shorter than the original request, as the requesting node may still be attempting to meet a timeout requirement of an earlier requesting node.

However, if it is determined at operation 222 that the response is not an error message, then the response is processed at operation 226, and the method 200 ends at operation 228.

Figure 3:
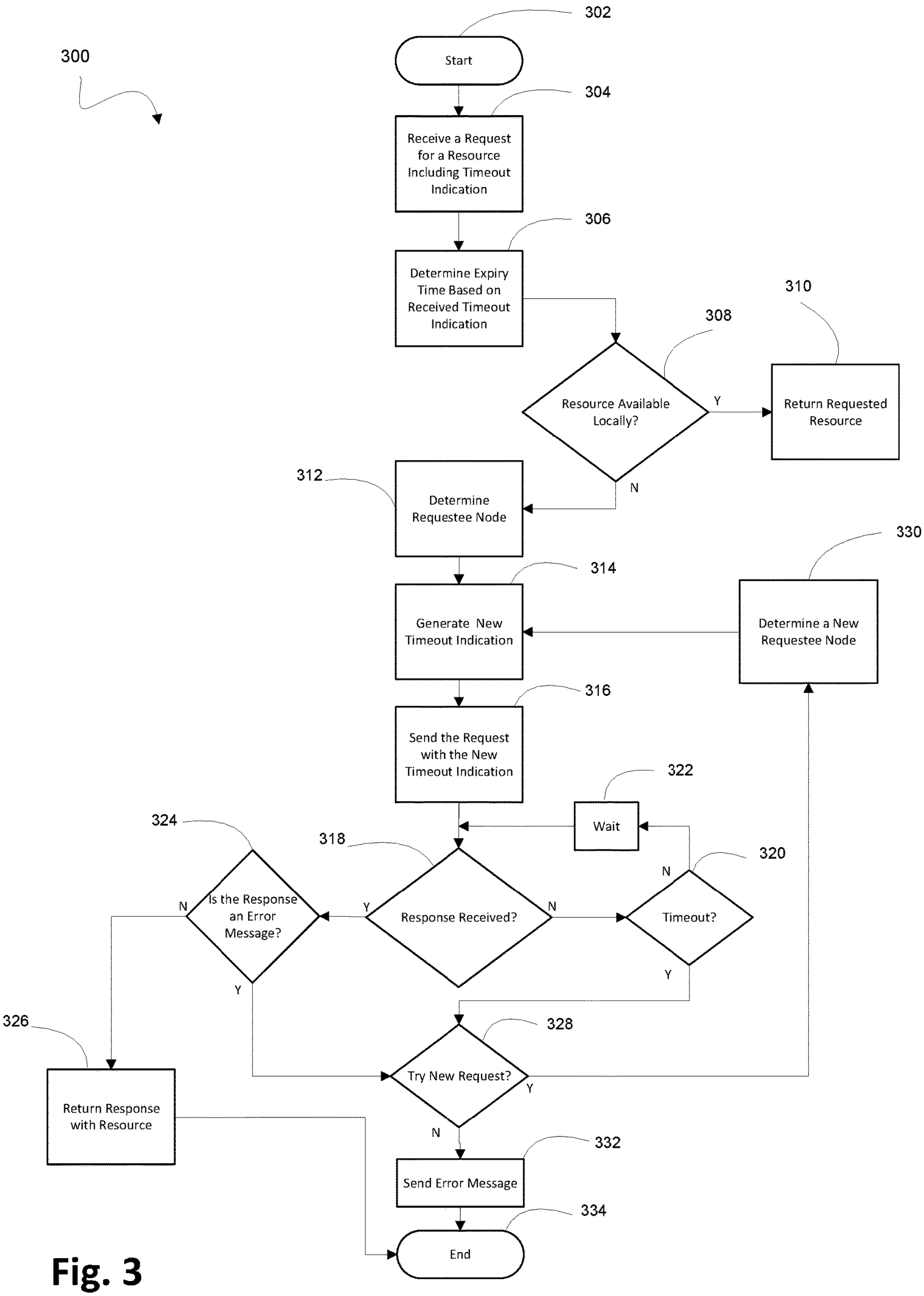
FIG. 3 shows a flowchart of another example method according to the present disclosure.

FIG. 3 depicts another method 300 according to examples of the present disclosure. In examples, method 300 may be performed by an intermediate node of a computing network, such as node B1 110 in FIG. 1. Flow begins at start operation 302 and proceeds to operation 304, where a request for a resource is received that includes a timeout indication. As discussed, the timeout indication may be included in a header of the request. For example, in relation to the example in FIG. 1, node A1 104 may include a first timeout indication in the header of an HTTP request to node B1 110 requesting a particular resource.

At operation 306, an expiry time is determined based on the timeout indication that was included in the received request. As discussed, the timeout indication may comprise a clock time (i.e., a deadline expressed as a time on a clock, assuming that the clocks used by the requesting node and the receiving node are synchronized). In other examples, the timeout indication may comprise a timeout period. In the timeout period example, the requestee node receiving the request may need to determine an expiry time based on its own clock time upon receiving the request and the value of the timeout period. For example, if the request is received at a clock time X and the timeout period is an amount Y, then an expiry time may comprise the time that is Y later than the clock time X at which the request was received.

At operation 308, it is determined whether the requested resource is locally available. For example, node B1 110 may determine if it has the resource locally cached or is otherwise locally available to the node B1 110. If so, flow proceeds to operation 310, at which the requested resource is returned to the requesting node. If not, flow proceeds to operation 312, where it is determined where to send a request for the resource. For example, referring to FIG. 1, if node B1 110 determines that it does not have the requested resource available locally, it may determine to send a request for the resource (or forward the received request for the resource) to upstream node N 114.

Flow proceeds to operation 314, where a new timeout indication is generated. For example, as discussed, node B1 110 may determine a new (e.g., second) timeout indication to include in its request for the resource to upstream node N 114, wherein the new timeout indication specifies how long node B1 110 will wait for a response to its request for the resource. As discussed, the new timeout period may be shorter than the period specified in the request for the resource received by node B1 110 to ensure that node B1 110 can provide a response before the expiry time determined at operation 306. At operation 316, the request with the new timeout indication is sent to the determined requestee node. For example, node B1 110 may send the request for the resource that includes the new timeout indication to upstream node N 114.

At operation 318, it is determined whether a response to the request has been received. For example, node B1 110 may periodically determine whether a response has been received. In other examples, the determination may be made at a preset time prior to the expiry time determined at operation 306, upon notification that a message has been received from the requestee node (e.g., node N 114), or otherwise. If no response has been received, a determination is made at operation 320 whether to time out the request. For example, a determination may be made by node B1 110 whether a timeout period indicated by the new timeout indication (determined at operation 314) has elapsed or if a clock time indicated in the new timeout indication has been passed. As discussed, however, the decision whether to time out the request may allow for some propagation delay by extending the period or clock time indicated in the request by a particular amount before finally determining that the request should be timed out. If the decision is made not to time out the request, at operation 322, then the requesting node waits, and flow proceeds back to operation 318.

If a decision is made to time out the request, then flow proceeds to operation 328, where a determination is made whether to attempt a new request. In examples, this may be determined in relation to how much time is remaining prior to the expiry time determined in operation 306. For example, if node B1 110 determines that insufficient time remains before the requesting node (e.g., Node A1 104) will time out its original request, then it may not attempt to retrieve the resource from a new upstream node, and flow proceeds to operation 332, where an error message is sent (e.g., back to Node A1 104). However, if it is determined at operation 328 to attempt a new request for the resource, flow proceeds to operation 330, and a new requestee node is determined. Operation 330 may also include noting that the previous requestee node is faulty (e.g., inoperable) because no timely response was received. Flow then proceeds back to operation 314 to determine the new timeout indication for the request. In the example discussed in relation to FIG. 1, the timeout indication for the new request may be shorter than the original request from node B1 110 to node N 114 in order to still provide a response to node A1 104 prior to the expiry time determined at operation 306.

If at operation 318 it is determined that a response has been received, then it is determined at operation 324 whether the response is an error message. For example, requestee node N 114 may send an error message to node B1 110, indicating that it is not able to provide the resource. If the response is not an error message (and includes the requested resource) then flow proceeds to operation 326 and the requested resource is returned. For example, node B1 110 returns the requested resource to requesting node A1 114. If it is determined that the response is an error message, then flow proceeds to operation 328, where a determination is made whether to attempt a new request, as described above. Flow ends 334 after the resource is returned at operation 326 or an error message is sent at operation 332.

Figure 4:
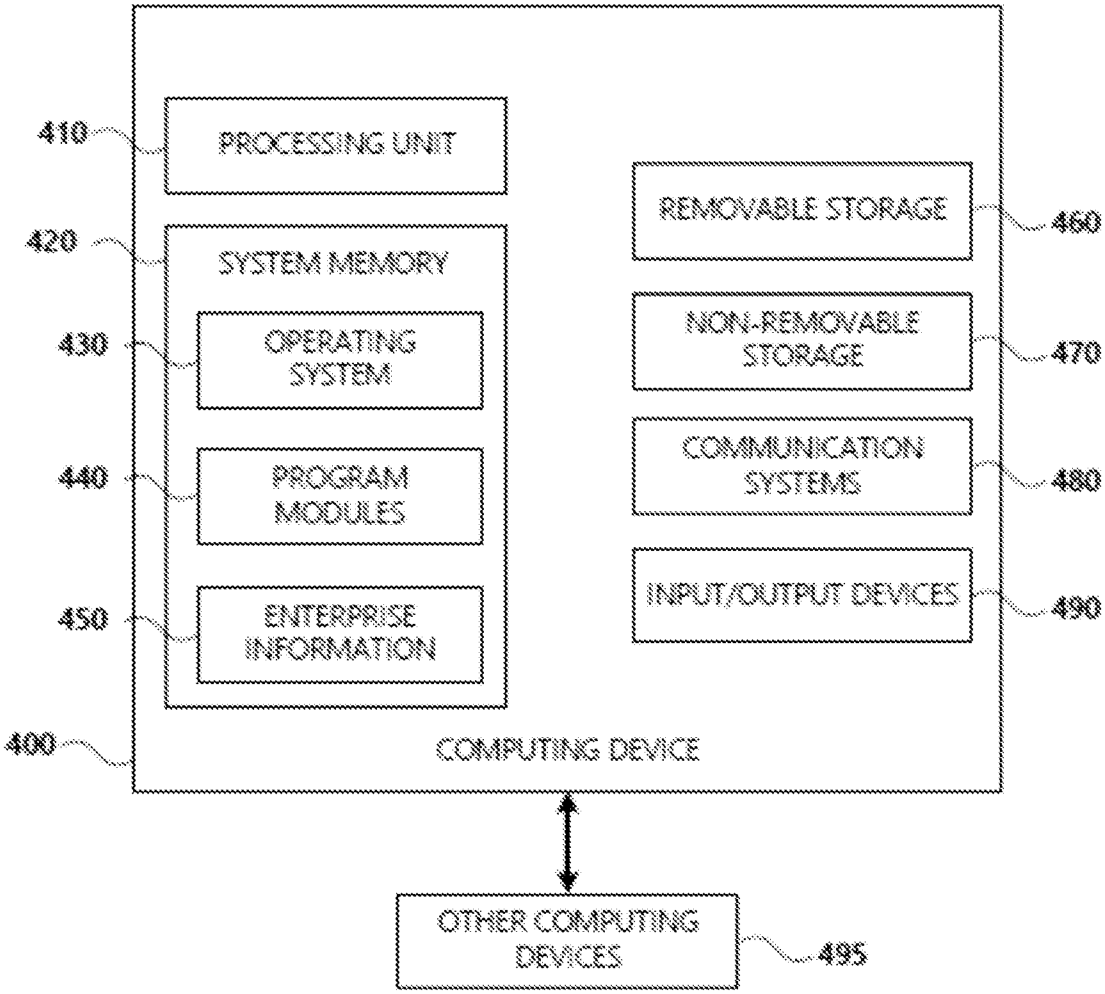
FIG. 4 shows a block diagram of a computing system with which one or more of the example embodiments described herein may be practiced.

FIG. 4 is a system diagram of a computing device 400 according to an example. The computing device 400, or various components and systems of the computing device 400, may be integrated or associated with nodes 104, 106, 108, 110, 114 and client computing devices 102. As shown in FIG. 4, the physical components (e.g., hardware) of the computing device 400 are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining enterprise information 450 such as domain information, telephone numbers, attestation level requests and so on. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media is non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Although the devices, systems, apparatus and methods have been described and illustrated in connection with certain embodiments, variations and modifications will be evident to those skilled in the art. Such variations and modifications may be made without departing from the scope and spirit of the present disclosure, and are therefore anticipated. The description and teachings herein are thus not to be limited to the precise details of methodology or construction set forth herein because variations and modification are intended to be included within the scope of the present disclosures and teachings.

We claim:

1. A method for managing requests in a computer network, comprising:

receiving, from a first node at a second node, a first request for a resource, wherein the first request comprises a first timeout indication corresponding to a first amount of time the first node will wait for a response to said first request for the resource, wherein the first timeout indication is included in a first header of the first request;

sending, by the second node to the first node, a response to the first request prior to an end of the first amount of time, wherein the response to the first request comprises either the resource or an error message;

sending a second request for the resource by the second node to a third node, wherein the second request comprises a second header with a second timeout indication corresponding to a second amount of time the second node will wait for a response to the second request, wherein the second amount of time is less than the first amount of time; and determining, by the second node, prior to an end of the second amount of time, whether the response to the second request has been received from the third node, wherein the first timeout indication comprises a clock time, and wherein the second amount of time is determined based at least on the first amount of time and an expected propagation delay between the second node and the third node.

2. The method of claim 1, wherein:

when the response to the second request has been received from the third node prior to the end of the second amount of time, determining whether the response to the second request includes the resource, and:

when the response to the second request includes the resource, sending the resource to the first node in the response to the first request; and when the response to the second request does not include the resource, determining a remaining time in the first time period, and, based on the remaining time in the first time period:

sending, by the second node, a third request to a fourth node for the resource; or sending the error message to the first node prior to the end of the first amount of time from the first request.

3. The method of claim 1, further comprising maintaining a connection between the first node and the second node when the response to the first request is received prior to the end of the first amount of time from the first request, and closing the connection between the first node and the second node when the response to the first request is not received prior to the end of the first amount of time from the first request.

4. The method of claim 1, wherein the first node comprises a first computing device and the second node comprises a second computing device that is different from the first computing device.

5. The method of claim 1, wherein the second amount of time is less than said first amount of time.

6. The method of claim 5, wherein the second amount of time is determined as a percentage of the first amount of time.

7. A system for managing requests in a computer network, comprising:

at least one processor;

memory operatively connected to said at least one processor; and instructions stored in said memory, wherein said instructions are executable to cause the system to:

receive, from a first node at a second node, a first request for a resource, wherein the first request comprises a first timeout indication corresponding to a first amount of time the first node will wait for a response to said first request for the resource, wherein the first timeout indication is included in a first header of the first request;

send, by the second node to the first node, a response to the first request prior to an end of the first amount of time from the first request, wherein the response to the first request comprises either the resource or an error message;

send a second request by the second node to a third node, wherein the second request comprises a second header with a second timeout indication corresponding to a second amount of time the second node will wait for a response to the second request, wherein the second amount of time is less than the first amount of time; and determine, by the second node, prior to an end of the second amount of time, whether the response to the second request has been received from the third node, wherein the first timeout indication comprises a clock time, and wherein the second amount of time is determined based at least on the first amount of time and an expected propagation delay between the second node and the third node.

8. The system of claim 7, wherein said instructions are executable to further cause the system to:

when the response to the second request has been received from the third node prior to the end of the second amount of time, determine whether the response to the second request includes the resource, and:

when the response to the second request includes the resource, send the resource to the first node in the response to the first request; and when the response to the second request does not include the resource, determine a remaining time in the first time period, and, based on the remaining time in the first time period:

send, by the second node, a third request to a fourth node for the resource; or send the error message to the first node prior to the end of the first amount of time from the first request.

9. The system of claim 7, wherein the second amount of time is less than said first amount of time.

* * * * *